(12) United States Patent
Bourge et al.

(10) Patent No.: US 7,012,960 B2
(45) Date of Patent: *Mar. 14, 2006

(54) METHOD OF TRANSCODING AND TRANSCODING DEVICE WITH EMBEDDED FILTERS

(75) Inventors: Arnaud Bourge, Paris (FR); Anthony Morel, Xi'An (FR)

(73) Assignee: Koninklijke Philips Electronics N.V., Eindhoven (NL)

(*) Notice: Subject to any disclaimer, the term of this patent is extended or adjusted under 35 U.S.C. 154(b) by 712 days.

This patent is subject to a terminal disclaimer.

(21) Appl. No.: 10/082,860

(22) Filed: Oct. 19, 2001

(65) Prior Publication Data

US 2002/0136311 A1 Sep. 26, 2002

(30) Foreign Application Priority Data

Oct. 24, 2000 (EP) ................................. 00402939
Mar. 6, 2001 (EP) ................................. 01400588

(51) Int. Cl.
*H04B 1/66* (2006.01)
(52) U.S. Cl. ........................ 375/240.12; 375/240.03; 375/240.16; 375/240.25; 375/240.26; 375/240.24; 348/699; 382/251; 382/233; 382/236; 382/235
(58) Field of Classification Search .......... 375/240.12, 375/240.25, 240.24, 240.29, 240.16, 240.03, 375/240.26; 348/699; 382/251, 233, 236, 382/235
See application file for complete search history.

(56) References Cited

U.S. PATENT DOCUMENTS

| | | | |
|---|---|---|---|
| 5,121,191 A | * | 6/1992 | Cassereau et al. ........... 348/443 |
| 5,451,954 A | * | 9/1995 | Davis et al. ................. 341/200 |
| 5,493,513 A | * | 2/1996 | Keith et al. .................. 709/247 |
| 5,537,440 A | * | 7/1996 | Eyuboglu et al. ....... 375/240.03 |

(Continued)

FOREIGN PATENT DOCUMENTS

| | | |
|---|---|---|
| EP | 0690392 A1 | 6/1995 |
| EP | 1032217 A2 | 12/1999 |
| WO | WO0051357 | 2/2000 |

OTHER PUBLICATIONS

A. Morel et al, "Spatial and Temporal Filtering in a Low-Cost MPEG Bit-Rate Transcoder", 2001 IEEE International Conference on Acoustics, Speech, and Signal Processing; Salt Lake, UT, vol. 3, 2001, pp. 1885-1888, XP002189333.

(Continued)

*Primary Examiner*—Shawn S. An

(57) ABSTRACT

The present invention relates to a method of transcoding (200) a primary encoded signal (S1) into a secondary encoded signal (S2). Said transcoding method comprising at least a step of decoding a current picture of the primary encoded signal, said decoding step comprising a dequantizing sub-step (12) for producing a first transformed signal (R1), an encoding step, following the decoding step, for obtaining the secondary encoded signal, said encoding step comprising a quantizing sub-step (13), and a step of predicting a transformed motion-compensated signal (Rmc) from a transformed encoding error (Re) derived from the encoding step, said prediction step being situated between the encoding and decoding steps. Said method of transcoding further comprises a filtering step (21), between the dequantizing sub-step and the quantizing sub-step, for obtaining a better picture quality for low bitrate applications.

8 Claims, 3 Drawing Sheets

U.S. PATENT DOCUMENTS

| | | | | |
|---|---|---|---|---|
| 5,621,468 A | * | 4/1997 | Kim | 375/240.16 |
| 5,870,146 A | * | 2/1999 | Zhu | 375/240 |
| 6,041,068 A | * | 3/2000 | Rosengren et al. | 370/538 |
| 6,178,205 B1 | * | 1/2001 | Cheung et al. | 375/240.29 |
| 6,434,197 B1 | * | 8/2002 | Wang et al. | 375/240.29 |
| 6,671,322 B1 | * | 12/2003 | Vetro et al. | 375/240.16 |

OTHER PUBLICATIONS

Shih-Fu Chang et al; "Manipulationi and Compositing of MC-DCT Compressed Video" IEEE Journal on Selected Areas in Cmmunicatins, IEEE INC. NY, vol. 13, No. 1, 1995, pp. 1-11, XP000492740.

* cited by examiner

METHOD OF TRANSCODING AND TRANSCODING DEVICE WITH EMBEDDED FILTERS

FIELD OF THE INVENTION

The present invention relates to a method of transcoding a primary encoded signal comprising a sequence of pictures, into a secondary encoded signal, said transcoding method comprising at least the steps of:

decoding a current picture of the primary encoded signal, said decoding step comprising a dequantizing sub-step for producing a first transformed signal, encoding, following the decoding step, for obtaining the secondary encoded signal, said encoding step comprising a quantizing sub-step.

The invention also relates to a corresponding device for carrying out such a method of transcoding.

This invention is particularly relevant to the transcoding of MPEG encoded video signals.

BACKGROUND OF THE INVENTION

Bitrate transcoding is a technique which allows a primary video stream encoded at a bitrate BR1 to be converted into a secondary video stream encoded at a bitrate BR2, lower than BR1, the bitrate reduction being performed in order to meet requirements imposed by the means of transport during broadcasting. A transcoding device as described in the opening paragraph is disclosed in European Patent Application n° EP 0690 392 (PHF 94001) and is depicted in FIG. 1. Said device (100) for transcoding encoded digital signals (S1) which are representative of a sequence of images, comprises a decoding channel (11,12) followed by an encoding channel (13,14,15). A prediction channel is connected in cascade between these two channels, and said prediction channel comprises, in series, between two subtractors (101, 102), an inverse discrete cosine transform circuit IDCT (16), a picture memory MEM (17), a circuit for motion-compensation MC (18) in view of displacement vectors (V) which are representative of the motion of each image, and a discrete cosine transform circuit DCT (19).

SUMMARY OF THE INVENTION

It is an object of the invention to provide a transcoding method and a corresponding device that allows a better quality of pictures for low bitrate applications. The present invention takes the following aspect into consideration.

With the advent of home digital video, recording of MPEG broadcasts, transcoders can be used in consumer devices to implement long-play modes or to guarantee the recording time. However, the input signal to be transcoded has often been encoded at a variable bitrate with a low average bit-rate. This is due to the generalization of statistical multiplexing that allows broadcasters to put a lot of video programs in a multiplex in order to save the bandwidth. It is likely that a coarser re-quantization of the input signal, using a prior art transcoding method, will lead to conspicuous quantization artifacts. In consequence, such a transcoding method is not adapted to low bitrate applications.

To overcome this drawback, the transcoding method in accordance with the invention is characterized in that it further comprises a filtering step between the dequantizing sub-step and the quantizing sub-step.

The transcoding method in accordance with the invention allows filters to be implemented at negligible cost in the prior art transcoder. These filters can be tuned to control the static and dynamic resolution and also to effect noise reduction. For the same number of bits, the filtered transformed signal is encoded with a smaller quantization scale, thus reducing visual artifacts such as blocking, ringing and mosquito noise.

In a first embodiment of the invention, the method of transcoding comprises a step of predicting a transformed motion-compensated signal from a transformed encoding error derived from the encoding step, said prediction step being situated between the encoding and decoding steps, and is characterized in that the filtering step is a temporal filtering step for receiving the transformed motion-compensated signal and the first transformed signal and for delivering a filtered transformed signal to the quantizing sub-step.

Such a temporal filtering step allows noise reduction to be performed using, for example, a recursive filter. In consequence, bits are only spent on the useful information contained in the picture and the picture quality is thus increased.

In a second embodiment of the invention, the method of transcoding also comprises a prediction step and is characterized in that the filtering step is a spatial filtering step for receiving the first transformed signal and for producing a filtered transformed signal, said filtered transformed signal and the transformed motion-compensated signal being delivered to the quantizing sub-step.

Such a spatial filtering allows a reduction of the sharpness of the picture and decreases the possible source of ringing and mosquito noise.

The present invention also relates to a corresponding device for carrying out such a transcoding method.

The present invention finally relates to a computer program product for a receiver, such as a digital video recorder or a set-top-box, which comprises a set of instructions, which, when loaded into the receiver, causes the receiver to carry out the method of transcoding.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
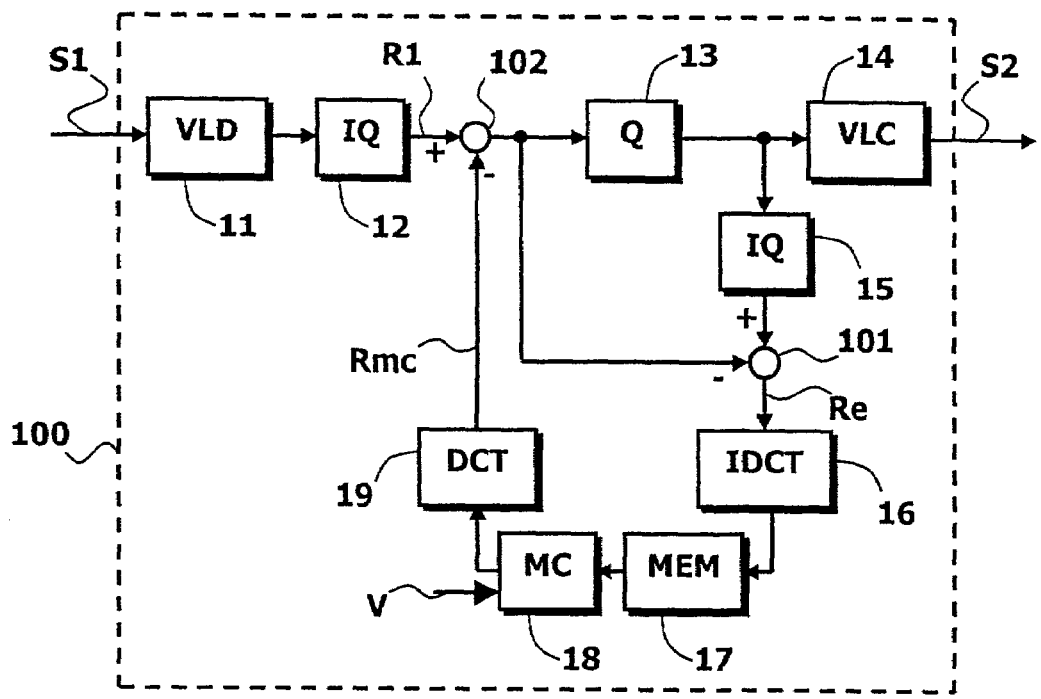
FIG. 1 is a block diagram corresponding to a transcoding device according to the prior art.

The present invention relates to an improved method of and a corresponding device for transcoding video encoded signals. It relates, more especially, to MPEG-2 encoded signals but it will be apparent to a person skilled in the art that said transcoding method also remains applicable to any type of video signals encoded via a block-based technique such as, for example, those provided by MPEG-1, MPEG-4, H-261 or H-263 standards.

A transcoding device allows a primary encoded signal (S1), previously encoded with a first quantization scale and comprising a sequence of pictures, to be converted into a secondary encoded signal (S2), encoded with a second quantization scale.

Such a transcoding device comprises at least the following elements:

a decoding unit, comprising a variable length decoder VLD and a first dequantizer IQ for decoding a current picture of the primary encoded signal and for delivering a first transformed signal, an encoding unit, comprising a quantizer Q, a variable length encoder VLC for obtaining the secondary encoded signal, and a second dequantizer IQ, a prediction unit, between the encoding unit and the decoding unit, and comprising in series:

an inverse discrete transform circuit IDCT (an Inverse Discrete Cosine Transform in the case of MPEG), a picture memory MEM, a circuit MC, for motion-compensation in view of displacement vectors which are representative of the motion of each picture, a discrete transform circuit DCT, for predicting a transformed motion-compensated signal (Rmc) from a transformed encoding error (Re) derived from the encoding unit, an adder, for determining a sum of the transformed motion-compensated signal and a transformed signal (R1 or Rf), a subtractor, for determining the transformed encoding error from a difference between said sum and a second transformed signal (R2) produced by the encoding unit, a filter circuit, between the first dequantizer and the quantizer, for delivering a filtered transformed signal (Rf).

Said filter circuit can be a temporal or a spatial filter circuit adapted to control the static and dynamic resolution and to perform noise reduction in a picture. The different implementations of such filters are described in the following FIGS. 2 to 5.

It will be apparent to a person skilled in the art that the result of the transcoding device is unchanged if the adder is replaced by another subtractor adapted to determine a difference between a transformed signal (R1 or Rf) and the transformed motion-compensated signal (Rmc) and if the first cited subtractor is adapted to determine the transformed encoding error (Re) from a difference between the second transformed signal (R2) and the output of the other subtractor.

In a first embodiment of the invention, the transcoder implements a motion-compensated temporal filter. Temporal filtering allows to reduce signals which are not correlated from frame to frame. It can very effectively reduce noise when combined with motion-compensation, as motion-compensation tries to correlate the image content from frame to frame. In this embodiment, a recursive filter is implemented since it provides a better selectivity at lower cost.

A naive transcoding chain with a motion-compensated recursive temporal filter usually comprises in cascade:

a decoder, for producing motion-compensated blocks D1 of decoded pictures from an input stream, a recursive temporal filter, for producing filtered blocks Df of decoded pictures, and an encoder, for producing an output stream and motion-compensated blocks D2 of locally decoded pictures after encoding.

To reduce costs, the motion-compensation in the encoder is re-used in the recursive temporal filter. Thus, the signal D2 is fed back to said filter instead of Df. The filtering equation of a motion-compensated block Df(n,m) is then:

$$Df(n,m)=(1-\alpha)\cdot D1(n,m)+\alpha\cdot MC(D2(p(n)), V(n,m)), \quad (1)$$

where:

n is the index of the current picture, m is the index of a block of said current picture, V(n,m) is the motion associated with block m, of picture n, p(n) is the index of the anchor picture associated with image n, MC is the motion-compensation operator, and $\alpha$ is a positive scalar smaller than one that tunes the filter response.

An expression similar to equation (1) can be drawn for bidirectional motion-compensation. However, without loss of generality, we shall restrict the demonstration to the unidirectional case. Note that intra-encoded blocks cannot be filtered since no prediction is formed for them. Yet, intra-encoded blocks in non-intra pictures most often correspond to newly exposed regions that could not possibly be temporally filtered.

The naive transcoding chain can be simplified using the hypothesis that the motion-compensation information is unchanged. To this end, the motion-compensated block D1(n,m) is expressed as follows:

$$D1(n,m)=M^t\cdot R1(n,m)\cdot M+MC(D1(p(n)), V(n, m)), \quad (2)$$

where:

M is the 8×8 discrete cosine transform matrix, $M^t$ is the corresponding transposed matrix, and R1(n,m) is the residue retrieved from the input bit-stream after variable length decoding VLC and dequantization IQ.

M is defined by equation (3) and is such that $MM^t=I$:

$$M_{i,j} = \begin{cases} \sqrt{2}/4 & \text{if } i = 0, \\ \cos(i\pi(2j+1)/16)/2 & \text{otherwise.} \end{cases} \quad (3)$$

Then, the filtered block is encoded using the same motion-compensation information. Let Rf(n,m) be the corresponding residue:

$$Rf(n,m)=M\cdot Df(n,m)\cdot M^t-M\cdot MC(D2(p(n)), V(n,m))\cdot M^t. \quad (4)$$

The residue is then quantized and dequantized again to compute the locally decoded pictures D2. Let R2(n,m) be the quantized and dequantized residue:

$$R2(n,m)=M\cdot D2(n,m)\cdot M^t-M\cdot MC(D2(p(n)), V(n,m))\cdot M^t. \quad (5)$$

The equations (1) and (4) are combined, so that Rf is derived directly from D1 and D2:

$$Rf(n,m)=(1-\alpha)[M\cdot D1(n,m)\cdot M^t-M\cdot MC(D2(p(n)), V(n,m))\cdot M^t]. \quad (6)$$

Combining the equation (2) with equation (6) gives:

$$Rf(n,m)=(1-\alpha)[R1(n,m)+M\cdot MC(D1(p(n)), V(n,m))\cdot M^t-M\cdot MC(D2(p(n)), V(n,m))\cdot M^t]. \quad (7)$$

Since motion-compensation is performed identically from D1 and from D2, the motion-compensation operator MC can operate on the picture difference, i.e., on the error signal due to the transcoding operation. Defining $\delta D = D1 - D2$, equation (7) is rewritten as follows:

$$Rf(n,m) = (1-\alpha)[R1(n,m) + M \cdot MC(\delta D(p(n)), V(n,m)) \cdot M^t]. \quad (8)$$

The error signal $\delta D$ can be derived from the prediction errors, combining equations (5) and (6):

$$\delta D(n, m) = M^t \left[ \frac{Rf(n, m)}{1-\alpha} - R2(n, m) \right] \cdot M. \quad (9)$$

Figure 2:
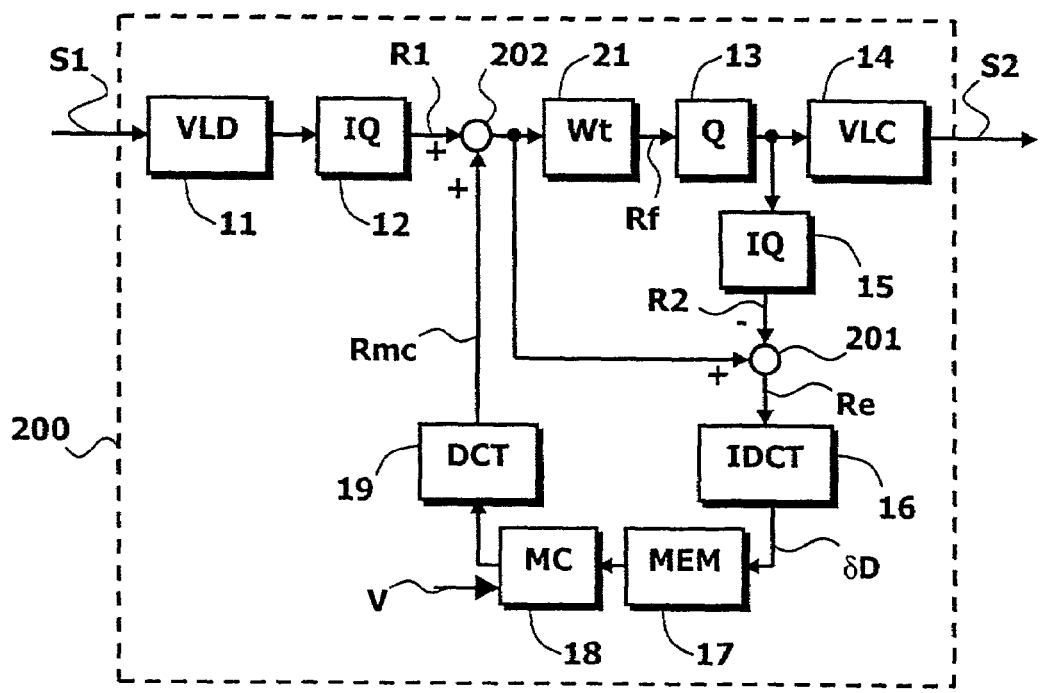
FIG. 2 is a block diagram corresponding to a first embodiment of a transcoding device according to the invention, said device comprising a temporal filter circuit.

Equations (8) and (9) define the transcoder structure depicted in FIG. 2. Said transcoder (200) comprises:
a decoding channel, comprising a variable length decoder VLD (11) and a first dequantizer IQ (12) for decoding a current picture of a primary encoded signal (S1) and for producing a first transformed signal (R1),
an encoding channel, comprising a quantizer Q (13), a variable length encoder VLC (14) for obtaining the secondary encoded signal (S2), and a second dequantizer IQ (15) for delivering a second transformed signal (R2),
a prediction channel, comprising in series:
  a subtractor (201), for determining a transformed encoding error (Re) and whose negative input receives the second transformed signal,
  an inverse discrete cosine transform circuit IDCT (16),
  a picture memory MEM (17),
  a circuit for motion-compensation MC (18),
  a discrete cosine transform circuit DCT (19), for predicting a transformed motion-compensated signal (Rmc),
  an adder (202), for delivering a sum of the transformed motion-compensated signal and the first transformed signal (R1) to the positive input of the subtractor,
a temporal filter circuit Wt (21), for receiving said sum and for delivering the filtered transformed signal (Rf) to the quantizer Q (13).

In an advantageous variant of the invention, the strength of the motion-compensated recursive temporal filter is adjusted separately for each transformed coefficient Rf[i], i.e., for each DCT sub-band. The transformed coefficient of rank i is multiplied by $W[i] = 1 - \alpha[i]$ such as:

$$Rf[i] = W[i](R1[i] + Rmc[i]) \quad (10)$$

Thus, the noise reduction can be tuned to the spectral shape of the noise. It can also be decided not to filter low frequencies in order to avoid visible artifact in case of a bad motion-compensation and in order to reduce the noise.

In the second and third embodiments of the invention, the transcoder implements a spatial filter. Spatial filtering is not so efficient to reduce the noise as motion-compensated temporal filtering is. Yet, it can prevent blocking artifacts at low bit-rate, smoothing down sharp edges that would otherwise create ringing effects. It can also simplify complex patterns that would otherwise be randomly distorted from one picture to the other, resulting in the so-called mosquito noise.

Let us consider again the naive transcoding chain. The pixel domain filter shall have the same granularity that the granularity the decoder has. Thus we consider a block-wise filter. Let D1(n,m) be block m of picture n. The filtered block D1(n,m) is computed as follows:

$$Df(n,m) = Fv(n) \cdot D1(n,m) \cdot Fh^t(n) \quad (11)$$

where Fv(n) and Fh(n) are matrices which define respectively the vertical and horizontal filtering within the block.

Combining the equation (11) with the equation (2), we find:

$$Df(n,m) = Fv(n) \cdot M^t \cdot R1(n,m) \cdot M \cdot Fh^t(n) + Fv(n) \cdot MC(D1(p(n)), V(n,m)) \cdot Fh^t(n) \quad (12)$$

If the filter is the same for a group of pictures, then $Fv(n) = Fv(p(n))$ and $Fh(n) = Fh(p(n))$. Thus, the following approximation can be given for equation (12) based on the assumption that block-wise filtering commutes with motion-compensation:

$$Df(n,m) = Fv(n) \cdot M^t \cdot R1(n,m) \cdot M \cdot Fh^t(n) + MC(Df(p(n)), V(n,m)) \quad (13)$$

It follows that the block-wise filter can be applied to residue R1(n,m) after an inverse discrete cosine transform IDCT. To implement the spatial filter in the transcoder, the residue R1(n,m) needs to be substituted by:

$$Rf(n,m) = M \cdot Fv(n) \cdot M^t \cdot R1(n,m) \cdot M \cdot Fh^t(n) \cdot M^t \quad (14)$$

Even if the matrices $M \cdot Fv(n) \cdot M^t$ and $M \cdot Fh^t(n) \cdot M^t$ can be pre-computed, their computing seems to involve many operations. Said computing can be simplified for a class of block-wise filters for which the two matrices are diagonal. Such filters are symmetric filters with an even number of taps. In our embodiment, we consider normalized 3-tap symmetric filters, since they are more suitable for small blocks. Such filters have a single parameter, denoted a. The corresponding pixel domain filtering matrix, $(F_{i,j})_{0 \leq i,j < 8}$, is defined by:

$$F_{i,j} = \frac{1}{2+a} \begin{cases} a & \text{for } i = j = 1 \text{ to } 6, \\ 1 & \text{for } i = j \pm 1, \\ 1+a & \text{for } i = j = 0 \text{ and } 7, \\ 0 & \text{otherwise.} \end{cases} \quad (15)$$

Then, $$M \cdot F_{i,j} \cdot M^t = \frac{1}{2+a} \begin{cases} 2\cos(i\pi/8) + a & \text{for } i = j \\ 0 & \text{otherwise.} \end{cases} \quad (16)$$

Thus, to implement filtering with horizontal parameter $a_h$ and vertical parameter $a_v$, the residue R1(n,m) needs to be weighted (component-wise) by $(Ws_{i,j})_{0 \leq i,j < 8}$ defined as follows:

$$Ws_{i,j} = \frac{2\cos(i\pi/8) + a_v}{2 + a_v} \cdot \frac{2\cos(j\pi/8) + a_h}{2 + a_h} \quad (17)$$

Figure 3:
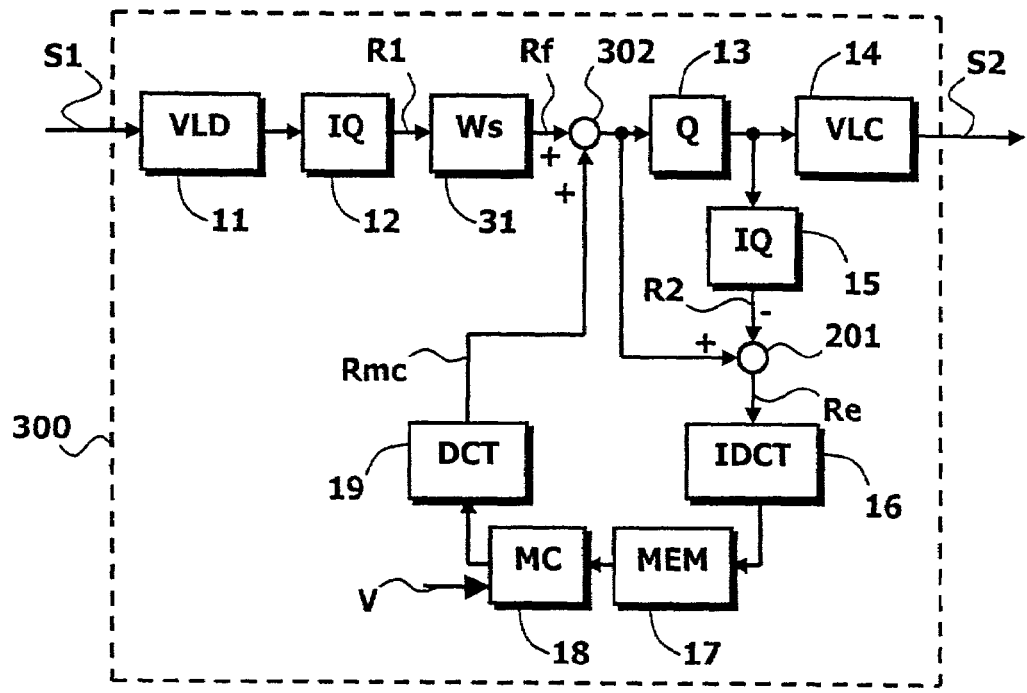
FIG. 3 is a block diagram corresponding to a second embodiment of a transcoding device according to the invention, said device comprising a spatial filter circuit, FIG. 4 a block diagram corresponding to a third embodiment of a transcoding device according to the invention, said device also comprising a spatial filter circuit, and FIG. 5 a block diagram corresponding to a fourth embodiment of a transcoding device according to the invention, said device also comprising a spatial filter circuit and, possibly, a temporal filter circuit.

FIG. 3 shows a transcoder with spatial pre-filtering according to the second embodiment of the invention. Said transcoder (300) comprises:
a decoding channel, comprising a variable length decoder VLD (11) and a first dequantizer IQ (12) for producing a first transformed signal (R1),
a spatial filter circuit Ws (31), for receiving said first transformed signal and for producing the filtered transformed signal (Rf),
an encoding channel, comprising a quantizer Q (13), a variable length encoder VLC (14) and a second dequantizer IQ (15) for producing a second transformed signal (R2), a prediction channel, comprising in series:
- a subtractor (201), for determining a transformed encoding error (Re) and whose negative input receives the second transformed signal,
- an inverse discrete cosine transform circuit IDCT (16),
- a picture memory MEM (17),
- a circuit for motion-compensation MC (18),
- a discrete cosine transform circuit DCT (19) for predicting a transformed motion-compensated signal (Rmc), and
- an adder (302), for delivering a sum of said transformed motion-compensated signal and the filtered transformed signal (Rf) to the positive input of the subtractor.

Figure 4:
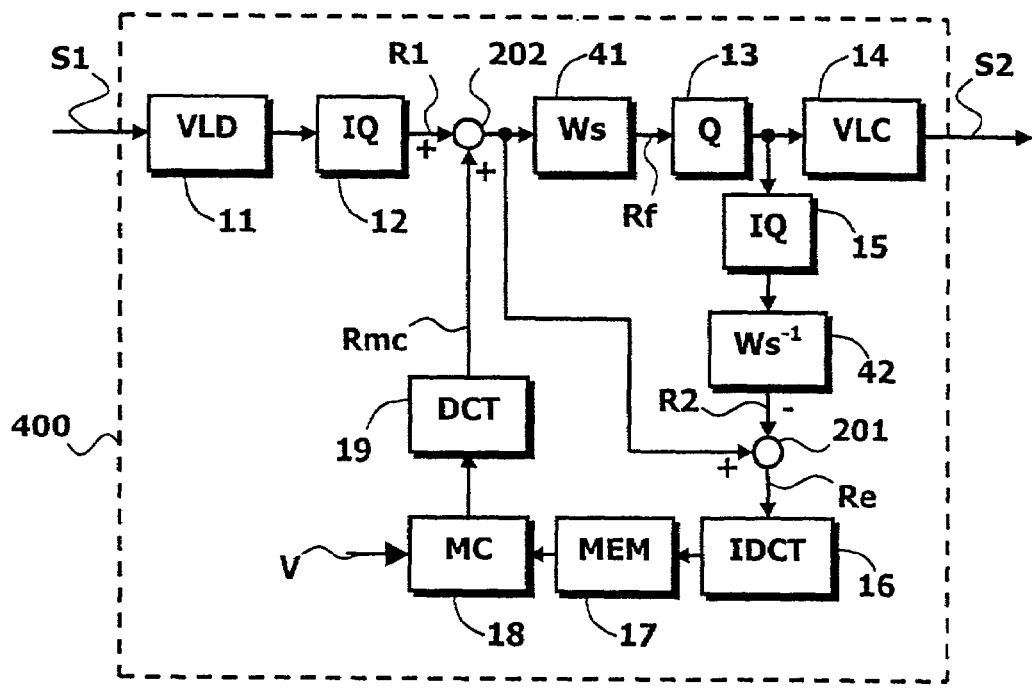

FIG. 4 is a transcoder according to the third embodiment of the invention, with spatial post-filtering whose weight factors are $Ws_{i,j}$. Said transcoder (400) comprises:
- a decoding channel, comprising a variable length decoder VLD (11) and a first dequantizer IQ (12) for producing a first transformed signal (R1),
- an encoding channel, comprising a quantizer Q (13), a variable length encoder VLC (14) and a second dequantizer IQ (15), and further comprising an inverse filter circuit (42) for producing a second transformed signal (R2),
- a prediction channel, comprising in series:
  - a subtractor (201), for determining a transformed encoding error (Re) and whose negative input receives the second transformed signal,
  - an inverse discrete cosine transform circuit IDCT (16),
  - a picture memory MEM (17),
  - a circuit for motion-compensation MC (18),
  - a discrete cosine transform circuit DCT (19), for predicting a transformed motion-compensated signal (Rmc),
  - an adder (202), for delivering a sum of said transformed motion-compensated signal and the first transformed signal (R1) to the positive input of the subtractor, and
- a spatial filter circuit Ws (41), for receiving said sum and for delivering a filtered transformed signal (Rf) to the encoding channel.

Compared to pre-filtering, the spatial filtering is performed in the encoding part of the transcoder.

Figure 5:
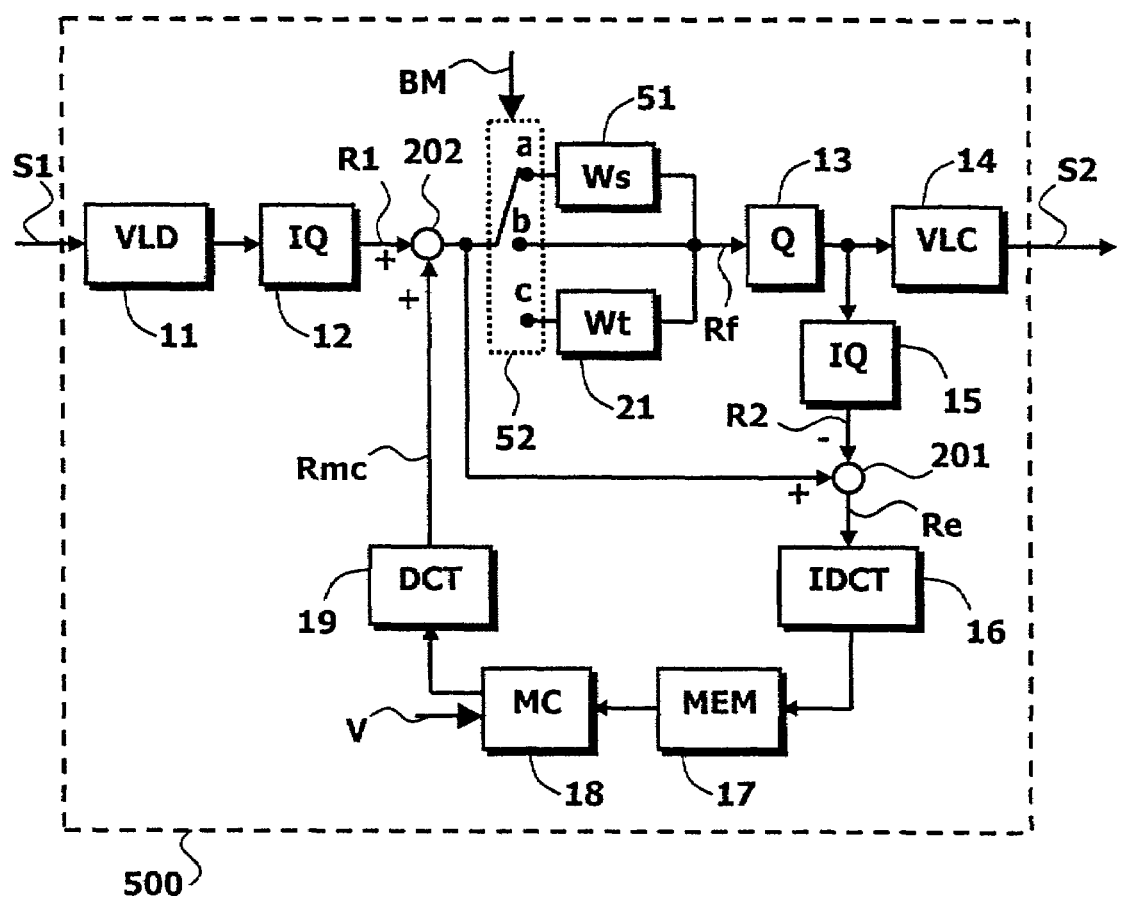

FIG. 5 is a transcoder according to the fourth embodiment of the invention, with spatial post-filtering. Said transcoder (500) comprises:
- a decoding channel comprising a variable length decoder VLD (11) and a first dequantizer IQ (12) for delivering a first transformed signal (RI),
- an encoding channel comprising a quantizer Q (13), a variable length encoder VLC (14) and a second dequantizer IQ (15) for delivering a second transformed signal (R2),
- a prediction channel comprising in series a subtractor (201) for determining a transformed encoding error (Re) and whose negative input receives the second transformed signal, an inverse discrete cosine transform circuit IDCT (16), a picture memory MEM (17), a circuit for motion-compensation MC (18), a discrete cosine transform circuit DCT (19) for predicting a transformed motion-compensated signal (Rmc), and an adder (202) for delivering a sum of said transformed motion-compensated signal and the first transformed signal (R1) to the positive input of the subtractor.

Said transcoder further comprises a switch (52), which has at least two positions. In a first position (a) of the switch, a spatial filter circuit Ws (51) is adapted to receive the output of the adder and to deliver a filtered transformed signal (Rf) to the quantizing circuit (13). In that case, and contrary to FIGS. 3 and 4, the spatial filter circuit is not applied to every macroblocks contained in the current picture, but is only applied to intra-coded macroblocks contained in said picture. In a second position (b) of the switch, no filtering is applied: this position corresponds mainly to non intra-coded macroblocks.

An alternative to this second position may be position (c), which corresponds to a temporal filter circuit Wt (51) as described hereinbefore and adapted to receive the output of the adder and to deliver a filtered transformed signal (Rf) to the quantizing circuit (13). As a consequence of said alternative, temporal filtering is applied, as usual, to non-intra-coded macroblocks and spatial filtering is applied to intra-coded macroblocks.

Such a method may improve the picture quality, especially when the noise level is high.

Moreover, the intra-coded macroblocks may be filtered with various filtering levels or even non filtered at all, depending on a macroblock-based measurement (BM) such as, for example, a noise measurement. For example, the current intra-coded macroblock is labeled as:
- a 'noisy' macroblock, if the macroblock-based measurement is higher than a first threshold,
- an 'edge' macroblock of a noisy area, if the macroblock-based measurement is higher than a second threshold and lower than the first threshold,
- a 'not noisy' macroblock, if the macroblock-based measurement is lower than the second threshold.

The spatial filter circuit is adapted to choose a suitable filter to be applied to the current intra-coded macroblock as a function of its label ('not noisy', 'noisy' or 'edge' macroblock). For example, if the macroblock is labeled 'not noisy', no filtering is done; if the macroblock is labeled 'noisy', a medium filtering is performed ($a_h=a_v=8$, for example); if the macroblock is labeled 'edge', a soft filtering is performed ($a_h=a_v=16$, for example).

In the previously described transcoders (200,300,400, 500), the filtering is performed on the dequantized data, which results in better accuracy. Best results, so far, were obtained for the combination of spatial filtering of pictures and temporal filtering of predicted pictures. Successive filtering blocks Wt or Ws can also be merged into a single block whose weighting is the product of the individual weightings, without departing from the scope of the invention.

The drawings and their description hereinbefore refer both to a transcoding device and a method of transcoding, a functional block of a diagram corresponding to a circuit of said device or a step of said method, respectively. They illustrate rather than limit the invention. It will be evident that there are numerous alternatives, which fall within the scope of the appended claims. In this respect, the following closing remarks are made.

There are numerous ways of implementing functions by means of items of hardware or software, or both. In this respect, the drawings of FIGS. 2 to 5 are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software or both carry out a function. For example, the filtering step can be combined with the quantization step, thus forming a single step without modifying the method of transcoding in accordance with the invention.

Said transcoding method can be implemented in a digital video recorder or in a set-top-box in several manners, such as by means of wired electronic circuits or, alternatively, by means of a set of instructions stored, for example, in a programming memory, said instructions replacing at least part of said circuits and being executable under the control of a digital processor in order to carry out the same functions as performed in said replaced circuits. For example, it is possible to implement the transcoding method using an integrated circuit, which is suitably programmed. The set of instructions contained in the programming memory may cause the integrated circuit to carry out the different steps of the transcoding method. The set of instructions may be loaded into the programming memory by reading a data carrier such as, for example, a disk. The set of instructions can also be made available by a service provider via a communication network such as, for example, the Internet.

Any reference sign in the following claims should not be construed as limiting the claim. It will be obvious that the use of the verb "to comprise" and its conjugations do not exclude the presence of any other steps or elements besides those defined in any claim. The word "a" or "an" preceding an element or step does not exclude the presence of a plurality of such elements or steps.

What is claimed is:

1. A method of transcoding a primary encoded signal (S1) comprising a sequence of pictures, into a secondary encoded signal (S2), said method of transcoding comprising at least the steps of:
   decoding a current picture of the primary encoded signal, said decoding step comprising a dequantizing sub-step (12) for producing a first transformed signal (R1),
   encoding, following the decoding step, for obtaining the secondary encoded signal, said encoding step comprising a quantizing sub-step (13), wherein said method of transcoding further comprises a filtering step between the dequantizing sub-step and the quantizing sub-step, said filtering step using a recursive filter wherein the recursive filtering step is intended to use a recursive filter such as: Rf[i]=(1—.alpha.[i]) (R1[i]+Rmc[i]), where Rf[i], R1[i] and Rmc[i] are transformed coefficients comprised in the transformed signals (Rf,R1, Rmc) and .alpha.[i] is a filter coefficient comprised between 0 and 1; and
   predicting a transformed motion-compensated signal from a transformed encoding error derived from the encoding step, said prediction step being situated between the encoding and decoding steps, wherein the recursive filtering step is for receiving the transformed motion-compensated signal and the first transformed signal and for delivering a filtered transformed signal to the quantizing sub-step.

2. A computer program product for a digital video recorder, which computer program product comprises a set of instructions, which, when loaded into said digital video recorder, causes the digital video recorder to carry out the method as claimed in claim 1.

3. A computer program product for a set-top-box, which computer program product comprises a set of instructions, which, when loaded into said set-top-box, causes the set-top-box to carry out the method as claimed in claim 1.

4. A method of transcoding a primary encoded signal comprising a sequence of pictures, into a secondary encoded signal, said method of transcoding comprising at least the steps of:
   decoding a current picture of the primary encoded signal, said decoding step comprising a dequantizing sub-step for producing a first transformed signal,
   encoding, following the decoding step, for obtaining the secondary encoded signal, said encoding step comprising a quantizing sub-step, wherein said method of transcoding further comprises a filtering step between the dequantizing sub-step and the quantizing sub-step; and
   predicting a transformed motion-compensated signal from a transformed encoding error derived from the encoding step, said prediction step being situated between the encoding and decoding steps, wherein the filtering step is a spatial filtering step for receiving the transformed motion-compensated signal and the first transformed signal and for delivering a filtered transformed signal to the quantizing sub-step, said spatial filtering step being only applied to intra-coded macroblocks contained in the current picture.

5. A method of transcoding as claimed in claim 4, characterized in that it further comprises a detection step for giving a label to a current macroblock, the spatial filtering step being adapted to apply a filter to the current macroblock as a function of said label.

6. A device for transcoding a primary encoded signal comprising a sequence of pictures, into a secondary encoded signal, said device comprising at least: a decoding unit for decoding a current picture of the primary encoded signal, said decoding unit comprising a dequantizing circuit for producing a first transformed signal, an encoding unit for obtaining the secondary encoded signal, said encoding unit comprising a quantizing circuit, characterized in that said transcoding device further comprises a recursive filter circuit between the dequantizing circuit and the quantizing circuit wherein the recursive filtering unit is intended to use a recursive filter such as: Rf[i]=(1–.alpha.[i]) (R1[i]+Rmc[i]), where Rf[i], R1[i] and Rmc[i] are transformed coefficients comprised in the transformed signals (Rf,R1,Rmc) and .alpha.[i] is a filter coefficient comprised between 0 and 1; and
   a prediction unit for predicting a transformed motion-compensated signal from a transformed encoding error derived from the encoding unit, said prediction unit being situated between the encoding unit and the decoding unit, wherein the recursive filter circuit is for receiving the transformed motion-compensated signal and the first transformed signal and for delivering a filtered transformed signal to the quantizing circuit.

7. A device for transcoding a primary encoded signal (S1) comprising a sequence of pictures, into a secondary encoded signal (S2), said device comprising at least: a decoding unit for decoding a current picture of the primary encoded signal, said decoding unit comprising a dequantizing circuit (12) for producing a first transformed signal (R1), an encoding unit for obtaining the secondary encoded signal, said encoding unit comprising a quantizing circuit (13), wherein said transcoding device further comprises a filter circuit between the dequantizing circuit and the quantizing circuit
   a prediction unit for predicting a transformed motion-compensated signal from a transformed encoding error derived from the encoding unit, said prediction unit being situated between the encoding and decoding units, wherein the filter circuit is a spatial filter circuit for receiving the transformed motion-compensated signal and the first transformed signal and for delivering a filtered transformed signal to the quantizing circuit, said spatial filter circuit being only applied to intra-coded macroblocks contained in the current picture.

8. A transcoding device as claimed in claim 7, characterized in that it further comprises a detection circuit for giving a label to a current macroblock, the spatial filter circuit being adapted to apply a filter to the current macroblock as a function of said label.

* * * * *